(12) United States Patent
Jiang et al.

(10) Patent No.: US 12,185,128 B2
(45) Date of Patent: Dec. 31, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 380 days.

(21) Appl. No.: 17/842,756

(22) Filed: Jun. 16, 2022

(65) Prior Publication Data

US 2022/0408276 A1    Dec. 22, 2022

(30) Foreign Application Priority Data

Jun. 21, 2021   (CN) .......................... 202110684686.0

(51) Int. Cl.
*H04B 7/0413*   (2017.01)
*H04L 5/00*     (2006.01)
(Continued)

(52) U.S. Cl.
CPC .......... *H04W 16/28* (2013.01); *H04L 5/0051* (2013.01); *H04W 72/0446* (2013.01); *H04W 72/0453* (2013.01); *H04W 80/02* (2013.01)

(58) Field of Classification Search
CPC ..... H04B 7/0413; H04L 5/001; H04L 5/0023; H04L 5/0048; H04L 5/0051; H04L 5/0053; H04L 5/0096; H04W 16/28; H04W 36/0011; H04W 36/0058; H04W 36/0072; H04W 36/0077; H04W 36/04; H04W 36/085; H04W 72/0446; H04W 72/0453; H04W 72/21; H04W 72/23; H04W 80/02
See application file for complete search history.

(56) References Cited

U.S. PATENT DOCUMENTS 11,470,618 B2 * 10/2022 Zhou ...................... H04L 1/1822
2022/0386355 A1 * 12/2022 Yi ......................... H04W 72/569
(Continued)

OTHER PUBLICATIONS

Vivo, Feature lead summary on Enhancements on Multi-TRP inter-cell operation, R1-200xxxx, 3GPP TSG RAN WG1 #102-e-e-Meeting, Aug. 17-28, 2020, 10 pages.*

*Primary Examiner* — Frank Duong

(57) ABSTRACT

The present disclosure provides a method and device in a node for wireless communications. A node first receives a first signaling in a first time-frequency resource set, and the first signaling and a first reference signal resource are QCL; then receives a MAC-layer control unit, the MAC-layer control unit is used to indicate a second reference signal resource; and receives a second signaling in a second time-frequency resource set, and receives a second signal in a third time-frequency resource set; the first reference signal resource is associated with a first PCI, and the second reference signal resource is associated with a second PCI; the second signaling is used to indicate the third time-frequency resource set; the second signaling and the second reference signal resource are QCL. The application improves the method and device for updating TCI state under M-TRP to optimize the system performance.

20 Claims, 4 Drawing Sheets

(51) Int. Cl.
*H04W 16/28* (2009.01)
*H04W 72/0446* (2023.01)
*H04W 72/0453* (2023.01)
*H04W 80/02* (2009.01)

(56) References Cited

U.S. PATENT DOCUMENTS

2023/0188283 A1* 6/2023 Liu .................. H04W 72/0453
 370/329
2023/0199793 A1* 6/2023 Muruganathan ...... H04L 5/0053
 370/329
2023/0232313 A1* 7/2023 Ji ......................... H04L 5/0051
 370/329

* cited by examiner

METHOD AND DEVICE IN NODES USED FOR WIRELESS COMMUNICATION

CROSS REFERENCE TO RELATED APPLICATIONS

This application claims the priority benefit of Chinese Patent Application No. 202110684686.0, filed on Jun. 21, 2021, the full disclosure of which is incorporated herein by reference.

BACKGROUND

Technical Field

The present disclosure relates to transmission methods and devices in wireless communication systems, and in particular to a design scheme and device of transmission of a control channel and a data channel in wireless communications.

Related Art

In 5G New Radio (NR), Massive Multi-Input Multi-Output (MIMO) is a key technology. In the massive MIMO, multiple antennas based on beamforming to form a relatively narrow beam which points to a particular direction to improve the quality of communication. In 5G NR, a base station can update a Transmission Configuration Indication (TCI) used by a terminal to receive a Physical Downlink Control Channel (PDCCH) and a TCI used to receive a Physical Downlink Shared Channel (PDSCH) through a Medium Access Control (MAC) Control Element (CE), so as to ensure the performance gains brought by beamforming.

In the discussion of NR R17, for the scenario of Multi-Transmitter Receiver Point (TRP), issues related to inter-cell operations are under discussion. In RAN1 #104b-e meeting, an extra Physical Cell Identifier (PCI) different from a PCI of a serving cell is introduced.

SUMMARY

Inventors have found through researches that in inter-cell scenario of M-TRP in R17, one way of implementing mobility management is that different reference signal resources are associated to different PCIs, so that a terminal can indirectly know, based on a result of a measured reference signal, under which beam coverage the terminal is located, and thus different PCIs actually serve to distinguish between coverage and beam. Under this scenario, when a TCI of the terminal is updated by a signaling, a PCI associated with the TCI will affect the way the TCI is updated.

To address the above problem, the present disclosure provides a solution. It should be noted that although the above description uses massive MIMO and beam-based communication scenarios as examples, the present disclosure is also applicable to other scenarios, such as LIE multi-antenna systems, where similar technical effects can be achieved. Additionally, the adoption of a unified solution for various scenarios (including but not limited to massive MIMO, beam-based communications and LIE multi-antenna systems) contributes to the reduction of hardware complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

To solve the above problems, the present disclosure discloses a design method and device for transmission of control channel and data channel under Multi-TRP scenario. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict. Though originally targeted at cellular network, the present disclosure is also applicable to Internet of Things (IoT) and Internet of Vehicles (IoV). Though originally targeted at multi-carrier communications, the present disclosure is also applicable to single-carrier communications. Though originally targeted at multi-antenna communications, the present disclosure is also applicable to single-antenna communications. Besides, the present disclosure is not only targeted at communication scenarios of terminals and base stations, but also at communication scenarios between terminals and terminals, terminals and relays, Non-Terrestrial Networks as well as relays and base stations, where similar technical effects can be achieved. Additionally, the adoption of a unified solution for various scenarios, including but not limited to communication scenarios between terminals and base stations, contributes to the reduction of hardware complexity and costs.

Further, the embodiments of a first node in the present disclosure and the characteristics of the embodiments may be applied to a second node if no conflict is incurred, and vice versa. Particularly, for interpretations of the terminology, nouns, functions and variants (if not specified) in the present disclosure, refer to definitions given in Technical Specification (TS) 36 series, TS38 series and TS37 series of 3GPP specifications.

The present disclosure provides a method in a first node for wireless communications, comprising:

receiving a first signaling in a first time-frequency resource set, a demodulation reference signal of a channel occupied by the first signaling being Quasi Co-Located (QCL) with a first reference signal resource;

receiving a MAC-layer control unit, the MAC-layer control unit being used to indicate a second reference signal resource; and receiving a second signaling in a second time-frequency resource set, and receiving a second signal in a third time-frequency resource set;

herein, the first reference signal resource is associated with a first PCI (Physical Cell Identifier), and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, one technical feature of the above method is in: when updating a TCI used for receiving a PDCCH, if a PCI associated with a TCI before the update is the same as a PCI associated with a TCI after the update, it indicates that an inter-cell/inter-TRP mobility does not occur in the first node, so it is unnecessary to change a TCI of a PDSCH of the first node; conversely, if a PCI associated with a TCI before the update is different from a PCI associated with a TCI after the update, it indicates that an inter-cell/inter-TRP mobility occurs in the first node, so a TCI of a PDSCH of the first node also needs to be updated accordingly.

In one embodiment, another technical feature of the above method is in: through the above methods, the update of the TCI of the first node is optimized in such a way that the update of the TCI of the PDSCH follows the update of the TCI of the PDCCH when the first node performs inter-cell/inter-TRP mobility, thus ensuring the system performance and avoiding the change of the higher-layer state.

According to one aspect of the present disclosure, a first-type reference signal resource set comprises at least one first-type reference signal resource, and a second-type reference signal resource set comprises at least one second-type reference signal resource; when the first PCI is the same as the second PCI, the third reference signal resource is a first-type reference signal resource in the first-type reference signal resource set; or, when the first PCI is different from the second PCI, the third reference signal resource is a second-type reference signal resource in the second-type reference signal resource set.

In one embodiment, one technical feature of the above method is in: the first-type reference signal resource set and the second-type reference signal resource set are respectively TCI Lists of PDSCHs associated with the first node under the first PCI and the second PCI; and when a PCI handover occurs in the first node, a TCI List of a corresponding PDSCH is also switched with the PCI.

According to one aspect of the present disclosure, the second-type reference signal resource set is predefined, and the second-type reference signal resource set is associated with the second PCI.

In one embodiment, one technical feature of the above method is in: if the second-type reference signal resource set is not configured by an explicit signaling, the second-type reference signal resource set is predefined.

According to one aspect of the present disclosure, when the first PCI is the same as the second PCI, the second signaling is used to indicate the third reference signal resource out of the first-type reference signal resource set; or, when the first PCI is different from the second PCI, the second signaling is used to indicate the third reference signal resource out of the second-type reference signal resource set.

According to one aspect of the present disclosure, when the first PCI is different from the second PCI, the second-type reference signal resource set only comprises the second reference signal resource, and the third reference signal resource is the second reference signal resource.

In one embodiment, one technical feature of the above method is in: if the second-type reference signal resource set is not configured by an explicit signaling, the first node assumes that a PDSCH is received by adopting a TCI of a PDCCH.

According to one aspect of the present disclosure, comprising:
  receiving a first information block;
  herein, the first information block is used to indicate the first-type reference signal resource set.

According to one aspect of the present disclosure, comprising:
  receiving a second information block;
  herein, the second information block is used to indicate a first control resource set, and both the first time-frequency resource set and the second time-frequency resource set are associated with the first control resource set; the first reference signal resource and the second reference signal resource respectively correspond to a first TCI state and a second TCI state, and the MAC-layer control unit is used to indicate that the second TCI state is adopted for a reception for a PDCCH in the first control resource set.

The present disclosure provides a method in a second node for wireless communications, comprising:
  transmitting a first signaling in a first time-frequency resource set, a demodulation reference signal of a channel occupied by the second signaling and the second reference signal resource being QCL;
  transmitting a MAC-layer control unit, the MAC-layer control unit being used to indicate a second reference signal resource; and
  transmitting a second signaling in a second time-frequency resource set, and transmitting a second signal in a third time-frequency resource set;
  herein, the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

According to one aspect of the present disclosure, a first-type reference signal resource set comprises at least one first-type reference signal resource, and a second-type reference signal resource set comprises at least one second-type reference signal resource; when the first PCI is the same as the second PCI, the third reference signal resource is a first-type reference signal resource in the first-type reference signal resource set; or, when the first PCI is different from the second PCI, the third reference signal resource is a second-type reference signal resource in the second-type reference signal resource set.

According to one aspect of the present disclosure, the second-type reference signal resource set is predefined, and the second-type reference signal resource set is associated with the second PCI.

According to one aspect of the present disclosure, when the first PCI is the same as the second PCI, the second signaling is used to indicate the third reference signal resource out of the first-type reference signal resource set; or, when the first PCI is different from the second PCI, the second signaling is used to indicate the third reference signal resource out of the second-type reference signal resource set.

According to one aspect of the present disclosure, when the first PCI is different from the second PCI, the second-type reference signal resource set only comprises the second reference signal resource, and the third reference signal resource is the second reference signal resource.

According to one aspect of the present disclosure, comprising:
  transmitting a first information block;
  herein, the first information block is used to indicate the first-type reference signal resource set.

According to one aspect of the present disclosure, comprising:
  transmitting a second information block;
  herein, the second information block is used to indicate a first control resource set, and both the first time-frequency resource set and the second time-frequency resource set are associated with the first control resource set; the first reference signal resource and the second reference signal resource respectively correspond to a first TCI state and a second TCI state, and the MAC-layer control unit is used to indicate that the second TCI state is adopted for a reception for a PDCCH in the first control resource set.

The present disclosure provides a first node for wireless communications, comprising:
  a first receiver, receiving a first signaling in a first time-frequency resource set, a demodulation reference signal of a channel occupied by the first signaling and a first reference signal resource being QCL;
  a second receiver, receiving a MAC-layer control unit, the MAC-layer control unit being used to indicate a second reference signal resource; and
  a third receiver, receiving a second signaling in a second time-frequency resource set, and receiving a second signal in a third time-frequency resource set;
  herein, the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

The present disclosure provides a second node for wireless communications, comprising:
  a first transmitter, transmitting a first signaling in a first time-frequency resource set, a demodulation reference signal of a channel occupied by the second signaling and the second reference signal resource being QCL;
  a second transmitter, transmitting a MAC-layer control unit, the MAC-layer control unit being used to indicate a second reference signal resource; and
  a third transmitter, transmitting a second signaling in a second time-frequency resource set, and transmitting a second signal in a third time-frequency resource set;
  herein, the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, the present disclosure has the following advantages over conventional schemes:
  when updating a TCI used for receiving a PDCCH, if a PCI associated with a TCI before the update is the same as a PCI associated with a TCI after the update, it indicates that an inter-cell/inter-TRP mobility does not occur in the first node, so it is unnecessary to change a TCI of a PDSCH of the first node; conversely, if a PCI associated with a TCI before the update is different from a PCI associated with a TCI after the update, it indicates that an inter-cell/inter-TRP mobility occurs in the first node, so a TCI of a PDSCH of the first node also needs to be updated accordingly.
  through the above methods, the update of the TCI of the first node is optimized in such a way that the update of the TCI of the PDSCH follows the update of the TCI of the PDCCH when the first node performs inter-cell/inter-TRP mobility, thus ensuring the system performance and avoiding the change of the higher-layer state;
  the first-type reference signal resource set and the second-type reference signal resource set are respectively TCI Lists of PDSCHs associated with the first node under the first PCI and the second PCI; when a PCI handover occurs in the first node, a handover also occurs in a TCI List of a corresponding PDSCH with the PCI;
  if the second-type reference signal resource set is not configured by an explicit signaling, the second-type reference signal resource set is predefined; for example, it can assume that a TCI of a PDSCH is the same as a TCI of an updated PDCCH.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
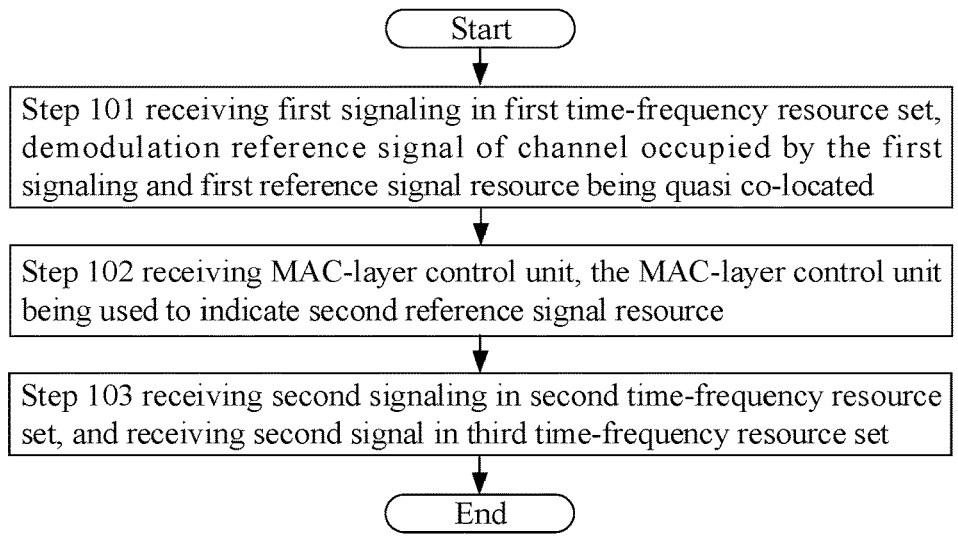
FIG. 1 illustrates a flowchart of the processing of a first node according to one embodiment of the present disclosure.

Embodiment 1 illustrates a flowchart of the processing of a first node, as shown in FIG. 1. In step 100 illustrated by FIG. 1, each box represents a step. In embodiment 1, a first node in the present disclosure receives a first signaling in a first time-frequency resource set in step 101, and a demodulation reference signal of a channel occupied by the first signal and a first reference signal resource are QCL; in step 102, receives a MAC-layer control unit, the MAC-layer control unit is used to indicate a second reference signal resource; in step 103 receives a second signaling in a second time-frequency resource set, and receives a second signal in a third time-frequency resource set.

In embodiment 1, the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, the first time-frequency resource set occupies more than one Resource Element (RE).

In one embodiment, frequency-domain resources occupied by the first time-frequency resource set are frequency-domain resources occupied by a Control Resource Set (CORESET).

In one embodiment, time-domain resource occupied by the first time-frequency resource set are time-domain resource occupied by a CORESET.

In one embodiment, time-domain resources occupied by the first time-frequency resource set belong to time-domain resources occupied by a search space.

In one embodiment, frequency-domain resources occupied by the second time-frequency resource set are frequency-domain resources occupied by a CORESET.

In one embodiment, time-domain resource occupied by the second time-frequency resource set are time-domain resource occupied by a CORESET.

In one embodiment, time-domain resources occupied by the second time-frequency resource set belong to time-domain resources occupied by a search space.

In one embodiment, frequency-domain resources occupied by the first time-frequency resource set and frequency-domain resources occupied by the second time-frequency set are the same.

In one embodiment, frequency-domain resources occupied by the first time-frequency resource set and frequency-domain resources occupied by the second time-frequency resource set belong to a same CORESET.

In one embodiment, time-domain resources occupied by the first time-frequency resource set and time-domain resources occupied by the second time-frequency set belong to a same search space.

In one embodiment, the first time-frequency resource set and the second time-frequency resource set are associated with a same ControlResourceSetId.

In one embodiment, the first time-frequency resource set and the second time-frequency resource set are associated with a same SearchSpaceId.

In one embodiment, time-domain resources occupied by the first time-frequency resource set and time-domain resources occupied by the second time-frequency set respectively belong to two different slots.

In one embodiment, a physical-layer channel occupied by the first signaling comprises a PDCCH.

In one embodiment, the first signaling is Downlink control information (DCI).

In one embodiment, the first reference signal resource comprises a Channel-State Information Reference Signals (CSI-RS) resource.

In one embodiment, the first reference signal resource comprises a Demodulation Reference Signal (DMRS) signal.

In one embodiment, the first reference signal resource comprises a Sounding Reference Signal (SRS) resource.

In one embodiment, the first reference signal resource comprises an SS/PBCH Block (SSB).

In one embodiment, the first reference signal resource corresponds to a TCI.

In one embodiment, the first reference signal resource corresponds to a TCI-State.

In one embodiment, the first reference signal resource corresponds to a TCI-StateId.

In one embodiment, the MAC-layer control unit is a MAC CE.

In one embodiment, a physical-layer channel occupied by the MAC-layer control unit comprises a PDSCH.

In one embodiment, the MAC-layer control unit is a TCI State Indication for UE-specific PDCCH MAC CE in TS 38.321.

In one embodiment, the second reference signal resource comprises a CSI-RS resource.

In one embodiment, the second reference signal resource comprises a DMRS resource.

In one embodiment, the second reference signal resource comprises an SRS resource.

In one embodiment, the second reference signal resource comprises an SSB.

In one embodiment, the second reference signal resource corresponds to a TCI.

In one embodiment, the second reference signal resource corresponds to a TCI-State.

In one embodiment, the second reference signal resource corresponds to a TCI-StateId.

In one embodiment, the second time-frequency resource set occupies more than one RE.

In one embodiment, a physical-layer channel occupied by the second signaling comprises a PDCCH.

In one embodiment, the second signaling is a piece of DCI.

In one embodiment, the second signaling is used to schedule the second signal.

In one embodiment, a physical-layer channel occupied by the second signal comprises a PDSCH.

In one embodiment, the second signal is a radio signal.

In one embodiment, the second signal is a baseband channel.

In one embodiment, the second signaling is used to indicate a Modulation and Coding Scheme (MCS) adopted by the second signal.

In one embodiment, the second signaling is used to indicate a HARQ process number of the second signal.

In one embodiment, the second signaling is used to indicate a Redundancy Version (RV) adopted by the second signal.

In one embodiment, the third time-frequency resource set occupies more than one RE.

In one embodiment, the first PCI is a non-negative integer.

In one embodiment, the first PCI is a PCI.

In one embodiment, the second PCI is a non-negative integer.

In one embodiment, the second PCI is a PCI.

In one embodiment, when the first PCI is the same the second PCI, the first PCI and the second PCI are both PCIs adopted by a serving cell of the first node.

In one embodiment, when the first PCI and the second PCI are different, the first PCI is a PCI adopted by a serving cell of the first node, and the second PCI is a PCI other than a PCI adopted by a serving cell of the first node.

In one embodiment, when the first PCI and the second PCI are different, the second PCI is a PCI adopted by a serving cell of the first node, and the first PCI is a PCI other than a PCI adopted by a serving cell of the first node.

In one embodiment, the meaning of the above phrase of the first reference signal resource being associated with a first PCI includes: an RRC signaling configuring the first reference signal resource is also used to indicate the first PCI.

In one embodiment, the meaning of the above phrase of the first reference signal resource being associated with a first PCI includes: an RRC signaling used to indicate time-frequency resources occupied by the first reference signal resource is also used to indicate the first PCI.

In one embodiment, the meaning of the above phrase of the first reference signal resource being associated with a first PCI includes: an RRC signaling used to indicate a QCL relation of the first reference signal resource is also used to indicate the first PCI.

In one embodiment, the meaning of the above phrase of the first reference signal resource being associated with a first PCI includes: the first PCI is used to generate a radio signal transmitted in the first reference signal resource.

In one embodiment, the meaning of the above phrase of the first reference signal resource being associated with a first PCI includes: the first PCI is used to generate a reference signal transmitted in the first reference signal resource.

In one embodiment, the meaning of the above phrase of the first reference signal resource being associated with a first PCI includes: the first PCI is used to scramble a radio signal transmitted in the first reference signal resource.

In one embodiment, the meaning of the above phrase of the first reference signal resource being associated with a first PCI includes: the first PCI is used to scramble a reference signal transmitted in the first reference signal resource.

In one embodiment, the meaning of the above phrase of the first reference signal resource being associated with a first PCI includes: the first PCI is associated with a first TRP, and the first TRP transmits a radio signal in the first reference signal resource.

In one embodiment, the meaning of the above phrase of the second reference signal resource being associated with a second PCI includes: an RRC signaling configuring the second reference signal resource is also used to indicate the second PCI.

In one embodiment, the meaning of the above phrase of the second reference signal resource being associated with a second PCI includes: an RRC signaling used to indicate time-frequency resources occupied by the second reference signal resource is also used to indicate the second PCI.

In one embodiment, the meaning of the above phrase of the second reference signal resource being associated with a second PCI includes: an RRC signaling used to indicate a QCL relation of the second reference signal resource is also used to indicate the second PCI.

In one embodiment, the meaning of the above phrase of the second reference signal resource being associated with a second PCI includes: the second PCI is used to generate a radio signal transmitted in the second reference signal resource.

In one embodiment, the meaning of the above phrase of the second reference signal resource being associated with a second PCI includes: the second PCI is used to generate a reference signal transmitted in the first reference signal resource.

In one embodiment, the meaning of the above phrase of the second reference signal resource being associated with a second PCI includes: the second PCI is used to scramble a radio signal transmitted in the second reference signal resource.

In one embodiment, the meaning of the above phrase of the second reference signal resource being associated with a second PCI includes: the second PCI is used to scramble a reference signal transmitted in the second reference signal resource.

In one embodiment, the meaning of the above phrase of the second reference signal resource being associated with a second PCI includes: the second PCI is associated with a second TRP, and the second TRP transmits a radio signal in the second reference signal resource.

In one embodiment, the third reference signal resource comprises a CSI-RS resource.

In one embodiment, the third reference signal resource comprises a DMRS resource.

In one embodiment, the third reference signal resource comprises an SRS resource.

In one embodiment, the third reference signal resource comprises an SSB.

In one embodiment, the third reference signal resource corresponds to a TCI.

In one embodiment, the third reference signal resource corresponds to a TCI-State.

In one embodiment, the third reference signal resource corresponds to a TCI-StateId.

In one embodiment, the MAC-layer control unit is used to determine a first time, the second signaling is later than the first time in time domain, and the first signaling is earlier than the first time in time domain.

In one embodiment, the second reference signal resource indicated by the MAC-layer control unit is in application at a first time, a slot occupied by the second signaling is later than the first time, and a slot occupied by the first signaling is earlier than the first time.

In one embodiment, when the first PCI and the second PCI are the same, the first signaling and the second signaling are transmitted by a same TRP; when the first PCI and the second PCI are different, the first signaling and the second signaling are respectively transmitted by two different TRPs.

In one embodiment, when the first PCI and the second PCI are the same, the first signaling and the second signaling are transmitted by a serving cell; when the first PCI and the second PCI are different, the first signaling and the second signaling are respectively transmitted by a serving cell and a non-serving cell.

In one embodiment, when the first PCI and the second PCI are the same, the first signaling and the second signaling are transmitted by a same cell adopting a serving cell PCI; when the first PCI and the second PCI are different, the first signaling and the second signaling are respectively transmitted by a cell adopting a serving cell PCI and a cell adopting an additional PCI.

Embodiment 2

Figure 2:
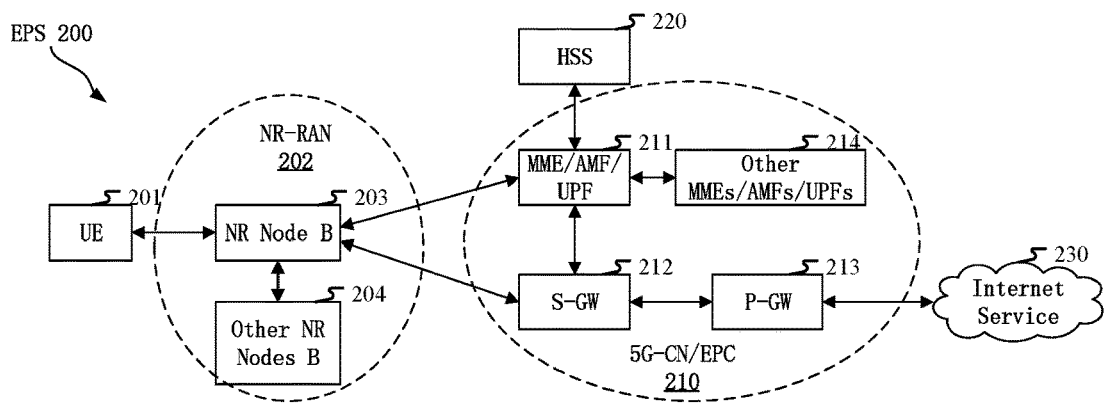
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LIE network architecture 200 may be called an Evolved Packet System (EPS) 200 or other appropriate terms. The EPS 200 may comprise UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 can receive PDCCHs from a plurality of TRPs at the same time.

In one embodiment, the UE 201 can receive CSI-RSs from a plurality of TRPs at the same time.

In one embodiment, the UE 201 can receive SSBs from a plurality of TRPs at the same time.

In one embodiment, the UE 201 is a terminal capable of monitoring a plurality of beams at the same time.

In one embodiment, the UE 201 is a terminal supporting Massive-MIMO.

In one embodiment, the gNB 203 corresponds to the second node in the present disclosure.

In one embodiment, the gNB 203 can transmit PDCCHs from a plurality of TRPs at the same time.

In one embodiment, a plurality of TRPs comprised in the gNB 203 can transmit CSI-RSs at the same time.

In one embodiment, a plurality of TRPs comprised in the gNB 203 can transmit SSBs at the same time.

In one embodiment, the gNB 203 supports a multi-beam transmission.

In one embodiment, the gNB 203 supports a Massive-MIMO based transmission.

In one embodiment, the gNB 203 comprises at least two TRPs.

In one embodiment, at least two TRPs comprised in the gNB 203 are connected via an ideal backhaul In one embodiment, the gNB 203 controls a plurality of cells to provide services for a terminal.

Embodiment 3

Figure 3:
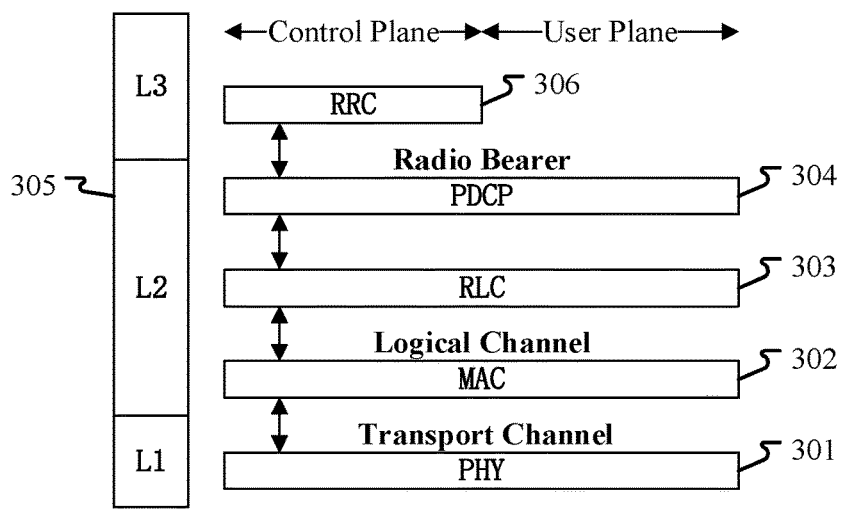
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 of the second communication node is used to generate scheduling of the first communication node.

In one embodiment, the PDCP 354 of the second communication node is used to generate scheduling of the first communication node.

In one embodiment, the first signaling is generated by the PHY 301 or the PHY 351.

In one embodiment, the first signaling is generated by the MAC 302 or the MAC 352.

In one embodiment, the MAC-layer control unit is generated by the MAC 302 or the MAC 352.

In one embodiment, the second signaling is generated by the PHY 301 or the PHY 351.

In one embodiment, the second signaling is generated by the MAC 302 or the MAC 352.

In one embodiment, the second signal is generated by the PHY 301 or the PHY 351.

In one embodiment, the second signal is generated by the MAC 302 or the MAC 352.

In one embodiment, the second signal is generated by the RRC 306.

In one embodiment, the first information block is generated by the MAC 302 or the MAC 352.

In one embodiment, the first information block is generated by the RRC 306.

In one embodiment, the second information block is generated by the MAC 302 or the MAC 352.

In one embodiment, the second information block is generated by the RRC 306.

In one embodiment, the first node is a terminal.

In one embodiment, the second node is a terminal.

In one embodiment, the second node is a Transmitter Receiver Point (TRP).

In one embodiment, the second node is a cell.

In one embodiment, the second node is an eNB.

In one embodiment, the second node is abase station.

In one embodiment, the second node is used to manage a plurality of TRPs.

In one embodiment, the second node is a node used for managing a plurality of cells.

Embodiment 4

Figure 4:
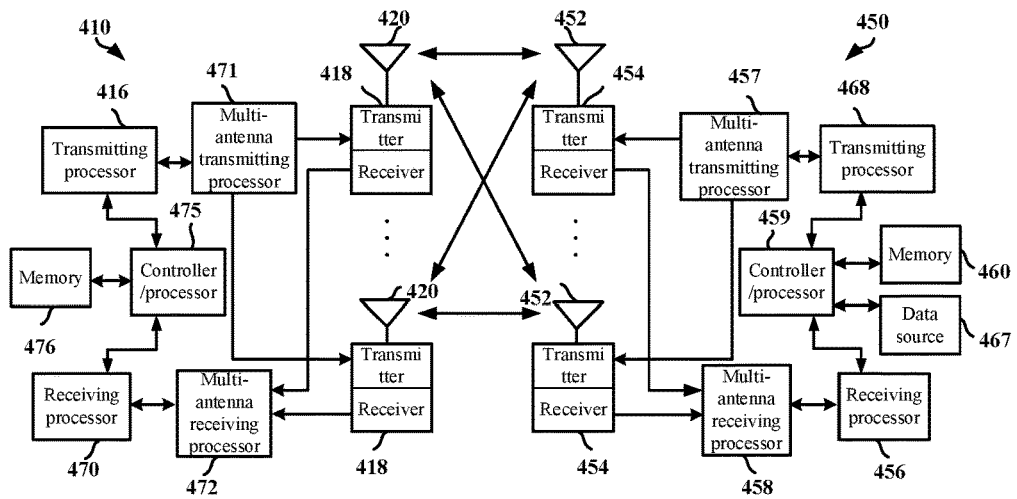
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 and a second communication device 410 that are in communications in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: first receives a first signaling in a first time-frequency resource set, a demodulation reference signal of a channel occupied by the first signaling is QCL with a first reference signal resource; then receives a MAC-layer control unit, the MAC-layer control unit is used to indicate a second reference signal resource; and receives a second signaling in a second time-frequency resource set, and receives a second signal in a third time-frequency resource set; the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, the first communication device 450 comprises at least one processor and at least one memory. a memory that stores a computer readable instruction program. The computer readable instruction program generates an action when executed by at least one processor. The action includes: first receiving a first signaling in a first time-frequency resource set, a demodulation reference signal of a channel occupied by the first signaling and a first reference signal resource being QCL; then receiving a MAC-layer control unit, the MAC-layer control unit being used to indicate a second reference signal resource; and receiving a second signaling in a second time-frequency resource set, and receiving a second signal in a third time-frequency resource set; the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: first transmits a first signaling in a first time-frequency resource set, a demodulation reference signal of a channel occupied by the first signaling is QCL with a first reference signal resource; then transmits a MAC-layer control unit, the MAC-layer control unit is used to indicate a second reference signal resource; and transmits a second signaling in a second time-frequency resource set, and transmits a second signal in a third time-frequency resource set; the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, the second communication device 410 comprises a memory that stores a computer readable instruction program. The computer readable instruction program generates an action when executed by at least one processor. The action includes: first transmitting a first signaling in a first time-frequency resource set, a demodulation reference signal of a channel occupied by the second signaling and the second reference signal resource being QCL; then transmitting a MAC-layer control unit, the MAC-layer control unit being used to indicate a second reference signal resource; and transmitting a second signaling in a second time-frequency resource set, and transmitting a second signal in a third time-frequency resource set; the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is a network device.

In one embodiment, the second communication device 410 is a serving cell.

In one embodiment, the second communication device 410 is a TRP.

In one embodiment, at least first four of the antenna 452, the receiver 454, the multi-antenna receiving processor 458, the receiving processor 456 and the controller/processor 459 are used to receive a first signaling in a first time-frequency resource set, and a demodulation reference signal of a channel occupied by the first signal and a first reference signal resource are QCL; at least first four of the antenna 420, the transmitter 418, the multi-antenna transmitting processor 471, the transmitting processor 416 and the controller/processor 475 are used to transmit a first signaling in a first time-frequency resource set, and a demodulation reference signal of a channel occupied by the first signaling and a first reference signal resource are QCL.

In one embodiment, at least first four of the antenna 452, the receiver 454, the multi-antenna receiving processor 458, the receiving processor 456 and the controller/processor 459 are used to receive a MAC-layer control unit, and the MAC-layer control unit is used to indicate a second reference signal resource; at least first four of the antenna 420, the transmitter 418, the multi-antenna transmitting processor 471, the transmitting processor 416 and the controller/processor 475 are used to transmit a MAC-layer control unit, and the MAC-layer control unit is used to indicate a second reference signal resource.

In one embodiment, at least first four of the antenna 452, the receiver 454, the multi-antenna receiving processor 458, the receiving processor 456 and the controller/processor 459 are used to receive a second signaling in a second time-frequency resource set, and receive a second signal in a third time-frequency resource set; at least first four of the antenna 420, the transmitter 418, the multi-antenna transmitting processor 471, the transmitting processor 416 and the controller/processor 475 are used to transmit a second signaling in a second time-frequency resource set, and transmit a second signal in a third time-frequency resource set.

In one embodiment, at least first four of the antenna 452, the receiver 454, the multi-antenna receiving processor 458, the receiving processor 456 and the controller/processor 459 are used to receive a first information block; at least first four of the antenna 420, the transmitter 418, the multi-antenna transmitting processor 471, the transmitting processor 416 and the controller/processor 475 are used to transmit a first information block.

In one embodiment, at least first four of the antenna 452, the receiver 454, the multi-antenna receiving processor 458, the receiving processor 456 and the controller/processor 459 are used to receive a second information block; at least first four of the antenna 420, the transmitter 418, the multi-antenna transmitting processor 471, the transmitting processor 416 and the controller/processor 475 are used to transmit a second information block.

Embodiment 5

Figure 5:
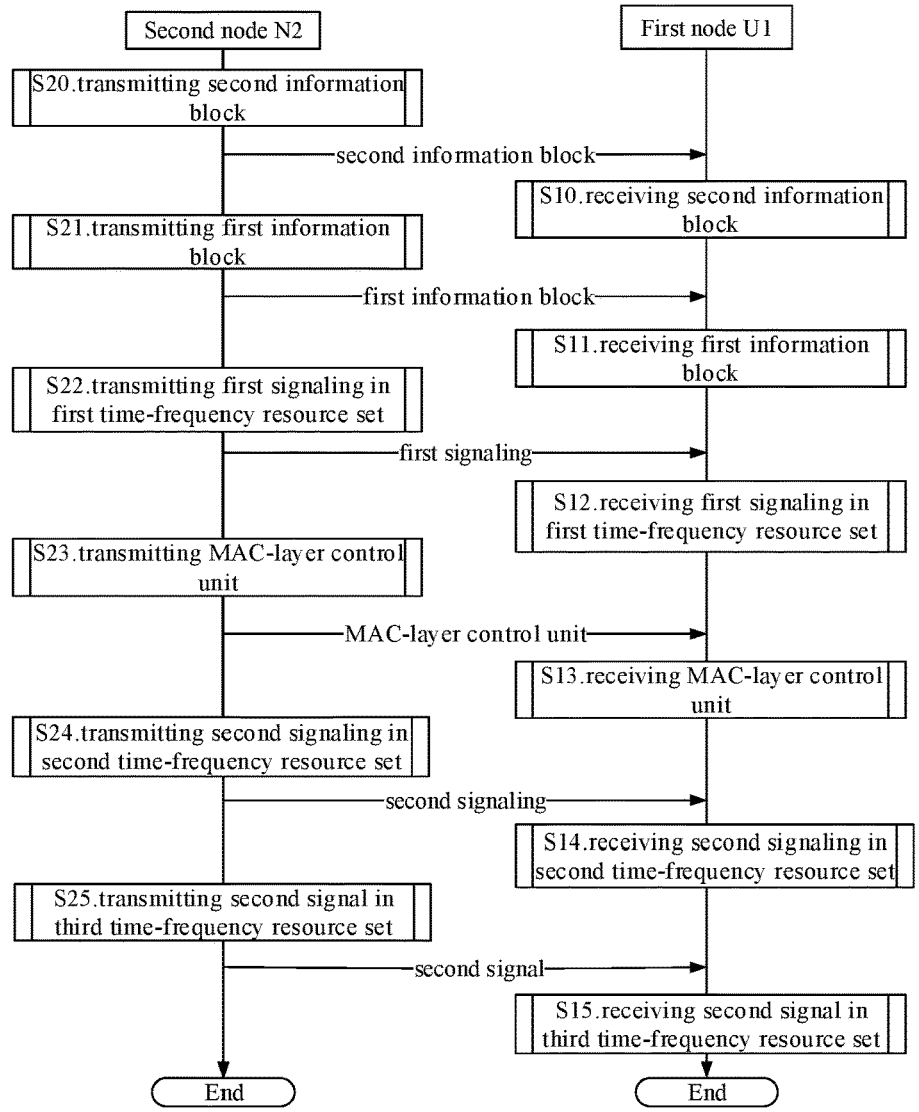
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node N2 are in communication via a radio link. It is particularly underlined that the order illustrated in the embodiment does not put constraints over sequences of signal transmissions and implementations.

The first node U1 receives a second information block in step S10; receives a first information block in step S11; receives a first signaling in a first time-frequency resource set in step S12; receives a MAC-layer control unit in step S13; receives a second signaling in a second time-frequency resource set in step S14; and receives a second signal in a third time-frequency resource set in step S15.

The second node N2 transmits a second information block in step S20; transmits a first information block in step S21; transmits a first signaling in a first time-frequency resource set in step S22; transmits a MAC-layer control unit in step S23; transmits a second signaling in a second time-frequency resource set in step S24; and transmits a second signal in a third time-frequency resource set in step S25.

In embodiment 5, a demodulation reference signal of a channel occupied by the first signaling is QCL with a first reference signal resource; the MAC-layer control unit is used to indicate a second reference signal resource; the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource; the first information block is used to indicate the first-type reference signal resource set; the second information block is used to indicate a first control resource set, and both the first time-frequency resource set and the second time-frequency resource set are associated with the first control resource set; the first reference signal resource and the second reference signal resource respectively correspond to a first TCI state and a second TCI state, and the MAC-layer control unit is used to indicate that the second TCI state is adopted for a reception for a PDCCH in the first control resource set.

In one embodiment, a first-type reference signal resource set comprises at least one first-type reference signal resource, and a second-type reference signal resource set comprises at least one second-type reference signal resource; when the first PCI is the same as the second PCI, the third reference signal resource is a first-type reference signal resource in the first-type reference signal resource set; or, when the first PCI is different from the second PCI, the third reference signal resource is a second-type reference signal resource in the second-type reference signal resource set.

In one subembodiment of the embodiment, the first-type reference signal resource set is associated with the first PCI.

In one subembodiment of the embodiment, the second-type reference signal resource set is associated with the second PCI.

In one subembodiment of the embodiment, the first-type reference signal resource set comprises K1 first-type reference signal resource(s).

In one subsidiary embodiment of the subembodiment, K1 is equal to 1.

In one subsidiary embodiment of the subembodiment, K1 is greater than 1.

In one subsidiary embodiment of the subembodiment, K1 is equal to 8.

In one subsidiary embodiment of the subembodiment, any of K1 first-type reference signal resource(s) comprises one of a CSI-RS resource or an SSB.

In one subsidiary embodiment of the subembodiment, any of K1 first-type reference signal resource(s) comprises one of a DMRS resource or an SRS resource.

In one subsidiary embodiment of the subembodiment, any of the K1 first-type reference signal resource(s) corresponds to a TCI.

In one subsidiary embodiment of the subembodiment, any of the K1 first-type reference signal resource(s) corresponds to a TCI-State.

In one subsidiary embodiment of the subembodiment, any of the K1 first-type reference signal resource(s) corresponds to a TCI-StateId.

In one subembodiment of the embodiment, the second-type reference signal resource set comprises K2 first-type reference signal resource(s).

In one subsidiary embodiment of the above embodiment, K2 is equal to 1.

In one subsidiary embodiment of the above embodiment, K2 is greater than 1.

In one subsidiary embodiment of the subembodiment, K2 is equal to 8.

In one subsidiary embodiment of the subembodiment, any of K2 second-type reference signal resource(s) comprises one of a CSI-RS resource or an SSB.

In one subsidiary embodiment of the subembodiment, any of K2 second-type reference signal resource(s) comprises one of a DMRS resource or an SRS resource.

In one subsidiary embodiment of the subembodiment, any of the K2 second-type reference signal resource(s) corresponds to a TCI.

In one subsidiary embodiment of the subembodiment, any of the K2 second-type reference signal resource(s) corresponds to a TCI-State.

In one subsidiary embodiment of the subembodiment, any of the K2 second-type reference signal resource(s) corresponds to a TCI-StateId.

In one subembodiment of the embodiment, the first-type reference signal resource set is different from the second-type reference signal resource set.

In one subsidiary embodiment of the subembodiment, there at least exists a first-type reference signal resource in the first-type reference signal resource set not belonging to the second-type reference signal resource set, and there at least exists a second-type reference signal resource in the second-type reference signal resource set not belonging to the first-type reference signal resource set.

In one subsidiary embodiment of the subembodiment, any first-type reference signal resource in the first-type reference signal resource set does not belong to the second-type reference signal resource set, and any second-type reference signal resource in the second-type reference signal resource set does not belong to the first-type reference signal resource set.

In one embodiment, the second-type reference signal resource set is predefined, and the second-type reference signal resource set is associated with the second PCI.

In one subembodiment of the embodiment, the above phrase of the second-type of reference signal resource set being predefined includes: the second-type reference signal resource set is configured by an RRC signaling.

In one subembodiment of the embodiment, the above phrase of the second-type of reference signal resource set being predefined includes: a second-type reference signal resource in the second-type reference signal resource set is associated with one or a plurality of SSBs.

In one subembodiment of the embodiment, the above phrase of the second-type of reference signal resource set being predefined includes: the second-type reference signal resource set is not configured by an explicit signaling.

In one subembodiment of the embodiment, the first node U1 will not receive information from the network side used for configuring a TCI for receiving a PDSCH after receiving the MAC-layer control unit and before receiving the second signaling.

In one subembodiment of the embodiment, the first node U1 will not receive a TCI States Activation/Deactivation for UE-specific PDSCH MAC CE from the network side after receiving the MAC-layer control unit and before receiving the second signaling.

In one embodiment, when the first PCI is the same as the second PCI, the second signaling is used to indicate the third reference signal resource out of the first-type reference signal resource set; or, when the first PCI is different from the second PCI, the second signaling is used to indicate the third reference signal resource out of the second-type reference signal resource set.

In one subembodiment of the embodiment, the second signaling comprises a first field; when the first PCI and the second PCI are the same, the first field comprised in the second signaling is used to indicate the third reference signal resource out of the first-type reference signal resource set; when the first PCI and the second PCI are different, the first field comprised in the second signaling is used to indicate the third reference signal resource out of the second-type reference signal resource set.

In one embodiment, when the first PCI is different from the second PCI, the second-type reference signal resource set only comprises the second reference signal resource, and the third reference signal resource is the second reference signal resource.

In one subembodiment of the embodiment, the second reference signal resource comprises an SSB.

In one embodiment, the first information block is transmitted by a MAC CE.

In one embodiment, a physical-layer channel occupied by the first information block comprises a PDSCH.

In one embodiment, the first information block is a TCI States Activation/Deactivation for UE-specific PDSCH MAC CE in TS 38.321.

In one embodiment, a reception of the first information block is earlier than a reception of the first signaling.

In one embodiment, the second information block is an RRC signaling.

In one embodiment, the second information block is a ControlResourceSet in TS 38.331.

In one embodiment, the first control resource set is a CORESET.

In one embodiment, the first control resource set comprises at least one CORESET.

In one embodiment, the second signal is a radio signal.

In one embodiment, the second signal is a baseband signal.

In one embodiment, the second signal is generated by a Transport Block (TB).

In one embodiment, the second signal is generated by a Code Block (CB).

In one embodiment, the second signal is generated by a Code Block Group (CBG).

In one embodiment, a transmission channel occupied by the second signal is a Downlink Shared Channel (DL-SCH).

In one embodiment, a QCL type between a demodulation reference signal of a channel occupied by the first signaling and a first reference signal resource is at least one of QCL Type D, QCL Type A, QCL Type B or QCL Type C.

In one embodiment, a QCL type between a demodulation reference signal of a channel occupied by the second signal and the second reference signal resource is at least one of QCL Type D, QCL Type A, QCL Type B or QCL Type C.

In one embodiment, a QCL type between a demodulation reference signal of a channel occupied by the second signal and a third reference signal resource is at least one of QCL Type D, QCL Type A, QCL Type B or QCL Type C.

Embodiment 6

Figure 6:
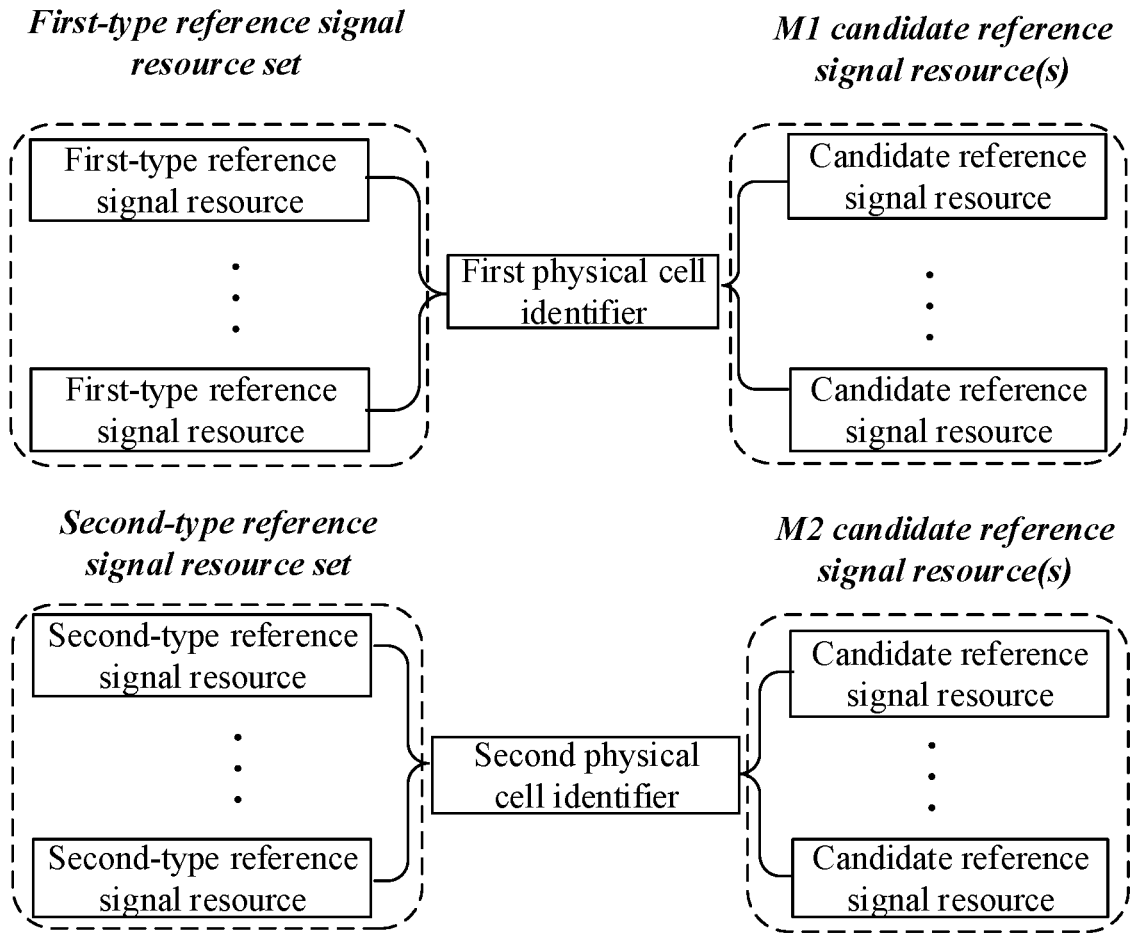
FIG. 6 illustrates a schematic diagram of a first reference signal resource and a second reference signal resource according to one embodiment of the present disclosure.

Embodiment 6 illustrates a schematic diagram of a first reference signal resource and a second reference signal resource, as shown in FIG. 6. In FIG. 6, the first PCI in the present disclosure is associated with M1 candidate reference signal resource(s), and the first PCI is associated with the first-type reference signal resource set in the present disclosure; the second PCI in the present disclosure is associated with M2 candidate reference signal resource(s), and the second PCI is associated with the second-type reference signal resource set in the present disclosure; M1 and M2 are both positive integers; the first reference signal resource is one of the M1 candidate reference signal resource(s); the second reference signal resource is one of the M1 candidate reference signal resource(s), or the second reference signal resource is one of the M2 candidate reference signal resource(s).

In one embodiment, any of the M1 candidate reference signal resource(s) comprises one of a CSI-RS resource or an SSB.

In one embodiment, any of the M1 candidate reference signal resource(s) corresponds to a TCI.

In one embodiment, any of the M1 candidate reference signal resource(s) corresponds to a TCI-State.

In one embodiment, any of the M1 candidate reference signal resource(s) corresponds to a TCI-StateId.

In one embodiment, any of the M2 candidate reference signal resource(s) comprises one of a CSI-RS resource or an SSB.

In one embodiment, any of the M2 candidate reference signal resource(s) corresponds to a TCI.

In one embodiment, any of the M2 candidate reference signal resource(s) corresponds to a TCI-State.

In one embodiment, any of the M2 candidate reference signal resource(s) corresponds to a TCI-StateId.

In one embodiment, when the second reference signal resource is one of the M1 candidate reference signal resource(s), the third reference signal resource is a first-type reference signal resource in the first-type reference signal resource set.

In one embodiment, when the second reference signal resource is one of the M2 candidate reference signal resource(s), the third reference signal resource is a second-type reference signal resource in the second-type reference signal resource set.

In one embodiment, the M1 candidate reference signal resource(s) is(are) used for a reception of a PDCCH.

In one embodiment, the M2 candidate reference signal resource(s) is(are) used for a reception of a PDCCH.

Embodiment 7

Figure 7:
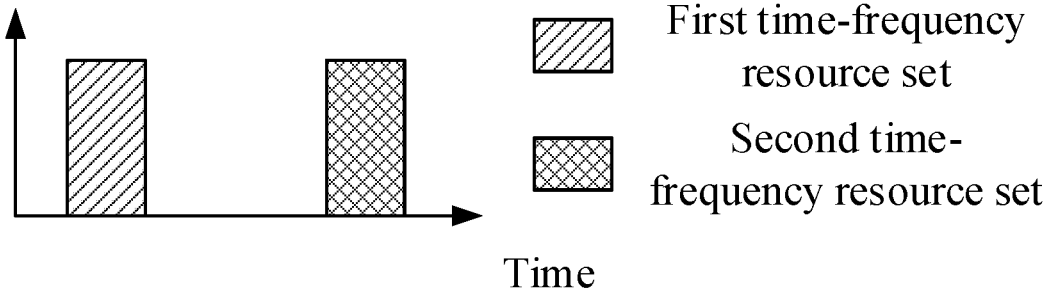
FIG. 7 illustrates a schematic diagram of a first time-frequency resource set and a second time-frequency resource set according to one embodiment of the present disclosure.

Embodiment 7 illustrates a schematic diagram of a first time-frequency resource set and a second time-frequency resource set, as shown in FIG. 7. In FIG. 7, the first time-frequency resource set and the second time-frequency resource set are associated with a CORESET, and the first time-frequency resource set and the second time-frequency resource set respectively belong to two orthogonal slots in time domain.

In one embodiment, the first time-frequency resource set and the second time-frequency resource set are associated with a search space.

In one embodiment, the first time-frequency resource set and the second time-frequency resource set are associated with a search space set.

In one embodiment, the first time-frequency resource set occupies at least one Orthogonal Frequency Division Multiplexing (OFDM) symbol in time domain, and occupies frequency-domain resources corresponding to at least one RB in frequency domain.

In one embodiment, the second time-frequency resource set occupies at least one OFDM symbol in time domain, and occupies frequency-domain resources corresponding to at least one RB in frequency domain.

Embodiment 8

Figure 8:
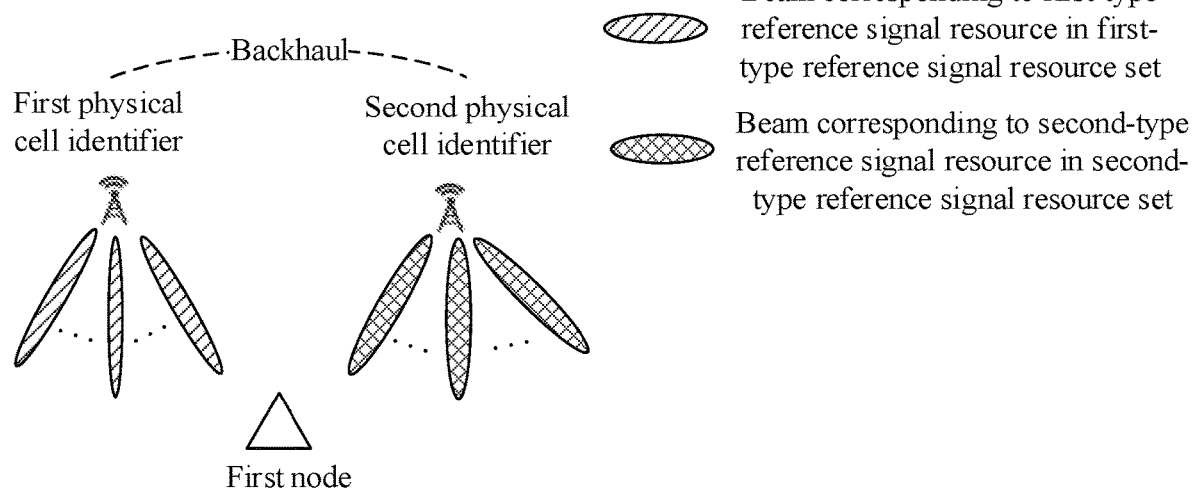
FIG. 8 illustrates a schematic diagram of an application scenario according to one embodiment of the present disclosure.

Embodiment 8 illustrates a schematic diagram of an application scenario, as shown in FIG. 8. In FIG. 8, the first-type reference signal resource set and the second-type reference signal resource set are respectively configured to a first PCI and a second PCI, and the second node controls services within the coverage of the first PCI and the services within the coverage of the second PCI at the same time, and the first node moves within the coverage of the first PCI and within the coverage of the second PCI.

In one embodiment, the first PCI and the second PCI are respectively configured to a first cell and a second cell.

In one subembodiment of the embodiment, the first cell and the second cell respectively adopt two different CORESET Pool Indexes.

In one subembodiment of the embodiment, the first cell and the second cell respectively correspond to two TRPs.

In one subembodiment of the embodiment, the first cell and the second cell are connected via an X2 interface.

In one subembodiment of the embodiment, the first cell and the second cell are connected via an S1 interface.

In one subembodiment of the embodiment, there exists an ideal backhaul link between the first cell and the second cell.

In one subembodiment of the embodiment, the first cell is an adjacent cell of a serving cell of the first node, and the second cell is a serving cell of the first node.

Embodiment 9

Figure 9:
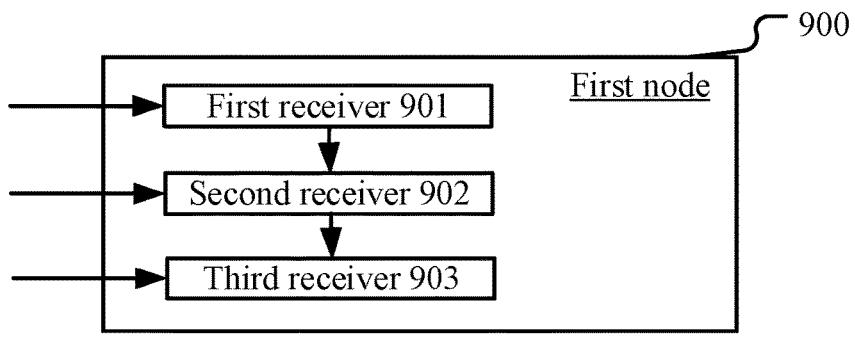
FIG. 9 illustrates a structure block diagram of a processing device in a first node according to one embodiment of the present disclosure.

Embodiment 9 illustrates a structure block diagram in a first node, as shown in FIG. 9. In FIG. 9, a first node 900 comprises a first receiver 901, a second receiver 902 and a third receiver 903.

The first receiver 901 receives a first signaling in a first time-frequency resource set, and a demodulation reference signal of a channel occupied by the first signaling is QCL with a first reference signal resource;

the second receiver 902 receives a MAC-layer control unit, and the MAC-layer control unit is used to indicate a second reference signal resource;

a third receiver 903 receives a second signaling in a second time-frequency resource set, and receives a second signal in a third time-frequency resource set;

In embodiment 9, the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, a first-type reference signal resource set comprises at least one first-type reference signal resource, and a second-type reference signal resource set comprises at least one second-type reference signal resource; when the first PCI is the same as the second PCI, the third reference signal resource is a first-type reference signal resource in the first-type reference signal resource set; or, when the first PCI is different from the second PCI, the third reference signal resource is a second-type reference signal resource in the second-type reference signal resource set.

In one embodiment, the second-type reference signal resource set is predefined, and the second-type reference signal resource set is associated with the second PCI.

In one embodiment, when the first PCI is the same as the second PCI, the second signaling is used to indicate the third reference signal resource out of the first-type reference signal resource set; or, when the first PCI is different from the second PCI, the second signaling is used to indicate the third reference signal resource out of the second-type reference signal resource set.

In one embodiment, when the first PCI is different from the second PCI, the second-type reference signal resource set only comprises the second reference signal resource, and the third reference signal resource is the second reference signal resource.

In one embodiment, the first receiver 901 receives a first information block; the first information block is used to indicate the first-type reference signal resource set.

In one embodiment, the first receiver 901 receives a second information block; the second information block is used to indicate a first control resource set, and both the first time-frequency resource set and the second time-frequency resource set are associated with the first control resource set; the first reference signal resource and the second reference signal resource respectively correspond to a first TCI state and a second TCI state, and the MAC-layer control unit is used to indicate that the second TCI state is adopted for a reception for a PDCCH in the first control resource set.

In one embodiment, the first receiver 901 comprises at least first four of the antenna 452, the receiver 454, the multi-antenna receiving processor 458, the receiving processor 456 and the controller/processor 459 in embodiment 4.

In one embodiment, the second receiver 902 comprises at least first four of the antenna 452, the receiver 454, the multi-antenna receiving processor 458, the receiving processor 456 and the controller/processor 459 in embodiment 4.

In one embodiment, the third receiver 903 comprises at least first four of the antenna 452, the receiver 454, the multi-antenna receiving processor 458, the receiving processor 456 and the controller/processor 459 in embodiment 4.

Embodiment 10

Figure 10:
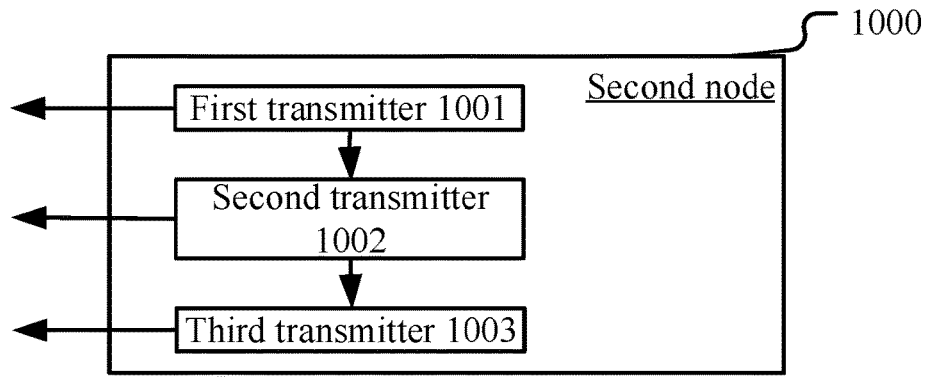
FIG. 10 illustrates a structure block diagram of a processing device in second node according to one embodiment of the present disclosure.

Embodiment 10 illustrates a structure block diagram in a second node, as shown in FIG. 10. In FIG. 10, a second node 1000 comprises a first transmitter 1001, a second transmitter 1002 and a third transmitter 1003.

The first transmitter 1001 transmits a first signaling in a first time-frequency resource set, the first signaling is used to indicate a first reference signal resource;

the second transmitter 1002 transmits a second signaling in a second time-frequency resource set;

the third transmitter 1003 transmits a second signaling in a second time-frequency resource set, and transmits a second signal in a third time-frequency resource set.

In embodiment 10, the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

In one embodiment, a first-type reference signal resource set comprises at least one first-type reference signal resource, and a second-type reference signal resource set comprises at least one second-type reference signal resource; when the first PCI is the same as the second PCI, the third reference signal resource is a first-type reference signal resource in the first-type reference signal resource set; or, when the first PCI is different from the second PCI, the third reference signal resource is a second-type reference signal resource in the second-type reference signal resource set.

In one embodiment, the second-type reference signal resource set is predefined, and the second-type reference signal resource set is associated with the second PCI.

In one embodiment, when the first PCI is the same as the second PCI, the second signaling is used to indicate the third reference signal resource out of the first-type reference signal resource set; or, when the first PCI is different from the second PCI, the second signaling is used to indicate the third reference signal resource out of the second-type reference signal resource set.

In one embodiment, when the first PCI is different from the second PCI, the second-type reference signal resource set only comprises the second reference signal resource, and the third reference signal resource is the second reference signal resource.

In one embodiment, the first transmitter 1001 transmits a first information block; the first information block is used to indicate the first-type reference signal resource set.

In one embodiment, the first transmitter 1001 transmits a second information block; the second information block is used to indicate a first control resource set, and both the first time-frequency resource set and the second time-frequency resource set are associated with the first control resource set; the first reference signal resource and the second reference signal resource respectively correspond to a first TCI state and a second TCI state, and the MAC-layer control unit is used to indicate that the second TCI state is adopted for a reception for a PDCCH in the first control resource set.

In one embodiment, the first transmitter 1001 comprises at least first four of the antenna 420, the transmitter 418, the multi-antenna transmitting processor 471, the transmitting processor 414 and the controller/processor 475 in embodiment 4.

In one embodiment, the second transmitter 1002 comprises at least first four of the antenna 420, the transmitter 418, the multi-antenna transmitting processor 471, the transmitting processor 414 and the controller/processor 475 in embodiment 4.

In one embodiment, the third transmitter 1003 comprises at least first four of the antenna 420, the transmitter 418, the multi-antenna transmitting processor 471, the transmitting processor 414 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The second node in the present disclosure includes but is not limited to macro-cellular base stations, femtocell, micro-cellular base stations, home base stations, relay base station, eNB, gNB, Transmitter Receiver Point (TRP), GNSS, relay satellites, satellite base stations, space base stations, RSUs, Unmanned Aerial Vehicle (UAV), test devices, for example, a transceiver or a signaling tester simulating some functions of a base station and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:
1. A first node for wireless communications, comprising:
  a first receiver, receiving a first signaling in a first time-frequency resource set, a demodulation reference signal of a channel occupied by the first signaling and a first reference signal resource being QCL;

a second receiver, receiving a MAC-layer control unit, the MAC-layer control unit being used to indicate a second reference signal resource; and a third receiver, receiving a second signaling in a second time-frequency resource set, and receiving a second signal in a third time-frequency resource set;

wherein the first reference signal resource is associated with a first Physical Cell Identifier (PCI), and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

2. The first node according to claim 1, wherein a first-type reference signal resource set comprises at least one first-type reference signal resource, and a second-type reference signal resource set comprises at least one second-type reference signal resource; when the first PCI is the same as the second PCI, the third reference signal resource is a first-type reference signal resource in the first-type reference signal resource set; or, when the first PCI is different from the second PCI, the third reference signal resource is a second-type reference signal resource in the second-type reference signal resource set.

3. The first node according to claim 2, wherein the second-type reference signal resource set is predefined, and the second-type reference signal resource set is associated with the second PCI.

4. The first node according to claim 2, wherein when the first PCI is the same as the second PCI, the second signaling is used to indicate the third reference signal resource out of the first-type reference signal resource set; or, when the first PCI is different from the second PCI, the second signaling is used to indicate the third reference signal resource out of the second-type reference signal resource set.

5. The first node according to claim 2, wherein when the first PCI is different from the second PCI, the second-type reference signal resource set only comprises the second reference signal resource, and the third reference signal resource is the second reference signal resource.

6. The first node according to claim 2, wherein the first receiver receives a first information block; the first information block is used to indicate the first-type reference signal resource set.

7. The first node according to claim 1, wherein the first receiver receives a second information block; the second information block is used to indicate a first control resource set, and both the first time-frequency resource set and the second time-frequency resource set are associated with the first control resource set; the first reference signal resource and the second reference signal resource respectively correspond to a first TCI state and a second TCI state, and the MAC-layer control unit is used to indicate that the second TCI state is adopted for a reception for a PDCCH in the first control resource set.

8. The first node according to claim 1, wherein the meaning of the first reference signal resource being associated with a first PCI includes at least one of the following:
the first PCI is used to generate a radio signal transmitted in the first reference signal resource;
the first PCI is used to generate a reference signal transmitted in the first reference signal resource;
the first PCI is used to scramble a radio signal transmitted in the first reference signal resource;
the first PCI is used to scramble a reference signal transmitted in the first reference signal resource.

9. The first node according to claim 1, wherein the meaning of the second reference signal resource being associated with a second PCI includes at least one of the following:
an RRC signaling configuring the second reference signal resource is also used to indicate the second PCI;
an RRC signaling used to indicate time-frequency resources occupied by the second reference signal resource is also used to indicate the second PCI;
an RRC signaling used to indicate a QCL relation of the second reference signal resource is also used to indicate the second PCI;
the second PCI is used to generate a radio signal transmitted in the second reference signal resource;
the second PCI is used to generate a reference signal transmitted in the first reference signal resource;
the second PCI is used to scramble a radio signal transmitted in the second reference signal resource;
the second PCI is used to scramble a reference signal transmitted in the second reference signal resource.

10. The first node according to claim 1, wherein both the first time-frequency resource set and the second time-frequency resource set are associated with a search space, or both the first time-frequency resource set and the second time-frequency resource set are associated with a search space set.

11. The first node according to claim 2, wherein the first-type reference signal resource set is associated with the first PCI, and the second-type reference signal resource set is associated with the second PCI.

12. The first node according to claim 2, wherein the second-type reference signal resource set is predefined, and the meaning of the predefined includes at least one of following:
the second-type reference signal resource set is configured by an RRC signaling;
a second-type reference signal resource in the second-type reference signal resource set is associated with one or a plurality of SSBs;
the second-type reference signal resource set is not configured by an explicit signaling;
the first node U1 will not receive information from the network side used for configuring a TCI for receiving a PDSCH after receiving the MAC-layer control unit and before receiving the second signaling;
the first node will not receive a TCI States Activation/Deactivation for UE-specific PDSCH MAC CE from the network side after receiving the MAC-layer control unit and before receiving the second signaling.

13. A second node for wireless communications, comprising:
a first transmitter, transmitting a first signaling in a first time-frequency resource set, a demodulation reference signal of a channel occupied by the first signaling and the first reference signal resource being QCL;
a second transmitter, transmitting a MAC-layer control unit, the MAC-layer control unit being used to indicate a second reference signal resource; and
a third transmitter, transmitting a second signaling in a second time-frequency resource set, and transmitting a second signal in a third time-frequency resource set;

wherein the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

14. The second node according to claim 13, wherein a first-type reference signal resource set comprises at least one first-type reference signal resource, and a second-type reference signal resource set comprises at least one second-type reference signal resource; when the first PCI is the same as the second PCI, the third reference signal resource is a first-type reference signal resource in the first-type reference signal resource set; or, when the first PCI is different from the second PCI, the third reference signal resource is a second-type reference signal resource in the second-type reference signal resource set.

15. The second node according to claim 14, wherein the second-type reference signal resource set is predefined, and the second-type reference signal resource set is associated with the second PCI.

16. The second node according to claim 14, wherein when the first PCI is the same as the second PCI, the second signaling is used to indicate the third reference signal resource out of the first-type reference signal resource set; or, when the first PCI is different from the second PCI, the second signaling is used to indicate the third reference signal resource out of the second-type reference signal resource set.

17. The second node according to claim 14, wherein when the first PCI is different from the second PCI, the second-type reference signal resource set only comprises the second reference signal resource, and the third reference signal resource is the second reference signal resource.

18. The second node according to claim 13, wherein the meaning of the first reference signal resource being associated with a first PCI includes at least one of the following:
the first PCI is used to generate a radio signal transmitted in the first reference signal resource;
the first PCI is used to generate a reference signal transmitted in the first reference signal resource;
the first PCI is used to scramble a radio signal transmitted in the first reference signal resource;
the first PCI is used to scramble a reference signal transmitted in the first reference signal resource.

19. The second node according to claim 13, wherein the meaning of the second reference signal resource being associated with a second PCI includes at least one of the following:
an RRC signaling configuring the second reference signal resource is also used to indicate the second PCI;
an RRC signaling used to indicate time-frequency resources occupied by the second reference signal resource is also used to indicate the second PCI;
an RRC signaling used to indicate a QCL relation of the second reference signal resource is also used to indicate the second PCI;
the second PCI is used to generate a radio signal transmitted in the second reference signal resource;
the second PCI is used to generate a reference signal transmitted in the first reference signal resource;
the second PCI is used to scramble a radio signal transmitted in the second reference signal resource;
the second PCI is used to scramble a reference signal transmitted in the second reference signal resource.

20. A method in a first node for wireless communications, comprising:
receiving a first signaling in a first time-frequency resource set, a demodulation reference signal of a channel occupied by the first signaling and a first reference signal resource being QCL;
receiving a MAC-layer control unit, the MAC-layer control unit being used to indicate a second reference signal resource; and
receiving a second signaling in a second time-frequency resource set, and receiving a second signal in a third time-frequency resource set;
wherein the first reference signal resource is associated with a first PCI, and the second reference signal resource is associated with a second PCI; the first signaling and the second signaling are both physical-layer signalings, and the second signaling is used to indicate the third time-frequency resource set; a demodulation reference signal of a channel occupied by the second signaling and the second reference signal resource are QCL; a demodulation reference signal of a channel occupied by the second signal and a third reference signal resource are QCL; whether the first PCI is the same as the second PCI is used to determine the third reference signal resource.

* * * * *